US012103414B2

(12) United States Patent
Dowell (10) Patent No.: US 12,103,414 B2
(45) Date of Patent: Oct. 1, 2024

(54) SELECTIVE AND CONTROLLABLE SHAPE-MEMORY CABLE

(71) Applicant: JAGUAR LAND ROVER LIMITED, Warwickshire (GB)

(72) Inventor: Luke Dowell, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1794 days.

(21) Appl. No.: 15/323,981

(22) PCT Filed: Jul. 8, 2015

(86) PCT No.: PCT/EP2015/065576
§ 371 (c)(1),
(2) Date: Jan. 5, 2017

(87) PCT Pub. No.: WO2016/005438
PCT Pub. Date: Jan. 14, 2016

(65) Prior Publication Data
US 2017/0158068 A1    Jun. 8, 2017

(30) Foreign Application Priority Data
Jul. 10, 2014    (GB) ................................ 1412303

(51) Int. Cl.
*H02J 7/00*      (2006.01)
*B60L 53/14*    (2019.01)
(Continued)

(52) U.S. Cl.
CPC .............. *B60L 53/18* (2019.02); *B60L 53/14* (2019.02); *H01B 7/06* (2013.01); *H01B 7/065* (2013.01);
(Continued)

(58) Field of Classification Search
CPC .............. B60L 11/1816; B60L 2230/12; B60L 53/14; B60L 53/18; B60L 53/16;
(Continued)

(56) References Cited

U.S. PATENT DOCUMENTS 7,086,885 B2 *    8/2006    Alacqua .............. E05B 47/0009
                                                                       439/161
7,183,743 B2 *    2/2007    Geiger ..................... B60R 11/02
                                                                       320/111
(Continued)

FOREIGN PATENT DOCUMENTS

EP           2506378 A1    10/2012
JP      2003281943 A    10/2003
(Continued)

OTHER PUBLICATIONS

Combined Search and Examination Report under Sections 17 and 18(3) for Application No. GB1412303.8 dated Dec. 11, 2014.
(Continued)

*Primary Examiner* — Robert Grant
(74) *Attorney, Agent, or Firm* — Carlson, Gaskey & Olds, P.C.

(57) ABSTRACT

The present invention relates to a vehicle charging cable having a selective and controllable shape-memory. Selective shape memory cables of the present disclosure can advantageously adopt a different shape and/or forget a passively inherent thermoset shape, for example a spiral. Such selective shape memory cables have particular application for charging EVs and plug-in HEVs and may comprise a body; one or more primary wires accommodated by the body; a first means for biasing a region of the body (such as a thermosetting bias); and a second means for biasing all or part of said region of the body. The second means being responsive to an external stimulus, such as an electric (Continued)

current so that the second biasing means can be actively operated.

6 Claims, 8 Drawing Sheets

(51) Int. Cl.
    *B60L 53/18*     (2019.01)
    *H01B 7/06*     (2006.01)
    *H01B 9/00*     (2006.01)
    *H02G 11/00*     (2006.01)
    *H02G 3/04*     (2006.01)

(52) U.S. Cl.
    CPC ........... *H01B 9/006* (2013.01); *H02G 11/006* (2013.01); *H02J 7/0045* (2013.01); *H02G 3/0493* (2013.01); *Y02T 10/70* (2013.01); *Y02T 10/7072* (2013.01); *Y02T 90/12* (2013.01); *Y02T 90/14* (2013.01)

(58) Field of Classification Search
    CPC ........ H02J 7/0045; H02J 7/0021; H01B 7/06; H01B 7/065; H01B 9/006; G03B 2205/0076; F03G 7/065; C22F 1/006; C22F 1/008; C22F 1/001; H02G 11/006; H02G 3/0493; Y02T 10/7005; Y02T 10/7088; Y02T 90/121; Y02T 90/14
    USPC ..................... 320/109; 60/516–528; 396/133
    See application file for complete search history.

(56) References Cited

U.S. PATENT DOCUMENTS

| | | | | |
|---|---|---|---|---|
| 8,272,214 B2 * | 9/2012 | Mankame | ............ | D07B 1/0673 60/527 |
| 2003/0236533 A1 * | 12/2003 | Wilson | ............. | A61B 17/22031 606/127 |
| 2004/0248434 A1 * | 12/2004 | Fujimura | ............... | H01R 12/59 439/67 |
| 2005/0247480 A1 | 11/2005 | Schulz | | |
| 2008/0217927 A1 * | 9/2008 | Browne | ................... | E05B 83/16 292/28 |
| 2009/0043450 A1 * | 2/2009 | Tonegawa | ........... | B60L 11/1814 701/36 |
| 2009/0104945 A1 * | 4/2009 | Axelsson | ................. | H01B 7/40 455/569.1 |
| 2010/0104126 A1 * | 4/2010 | Greene | ................... | H01B 7/225 381/384 |
| 2011/0083325 A1 * | 4/2011 | Foley | ...................... | B21F 35/00 29/896.9 |
| 2011/0308835 A1 * | 12/2011 | Piekny | ................... | B65H 75/36 174/69 |
| 2012/0174573 A1 * | 7/2012 | Skurkis | ................ | D07B 1/0673 60/527 |
| 2012/0216524 A1 * | 8/2012 | Browne | .................... | F03G 7/06 60/527 |
| 2013/0106351 A1 * | 5/2013 | Nakamura | ........... | H02G 11/006 320/109 |
| 2013/0161055 A1 * | 6/2013 | Rule | ........................ | H01B 7/04 174/69 |
| 2014/0034382 A1 * | 2/2014 | Mateski | ................... | B60L 53/16 174/74 R |
| 2014/0225708 A1 * | 8/2014 | Usoro | ................ | H01H 61/0107 337/128 |

FOREIGN PATENT DOCUMENTS

| | | |
|---|---|---|
| WO | 2010/103495 A1 | 9/2010 |
| WO | 2011/084736 A2 | 7/2011 |
| WO | 2011/159912 A2 | 12/2011 |

OTHER PUBLICATIONS

International Search Report and Written Opinion of the International Searching Authority for International application No. PCT/EP2015/065576 dated Oct. 6, 2015.
Taylor Amarel: "Patent for Sale—Morphing Cable System—IdeaBuyer," Sep. 16, 2015, XP055216079, Retrieved from the Internet: URL:http//www.ideabuyer.com/ipavail/morphing-cable-system.

* cited by examiner

SELECTIVE AND CONTROLLABLE SHAPE-MEMORY CABLE

TECHNICAL FIELD

The present invention relates to a vehicle charging cable, a method of controlling a vehicle charging cable and a charging system for a vehicle comprising a cable. More particularly, but not exclusively, the present invention relates to a vehicle charging cable having a selective and controllable shape-memory. The invention finds advantageous application in charging systems where a cable is moved between a stowed position and a deployed position (also referred to as a "use position").

Aspects of the invention relate to a vehicle charging cable, a power supply cable, a charging station, a vehicle, a method and a control unit.

BACKGROUND

It is known to provide coiled or spiral cables that have a shape-memory. Such cables may carry electric wires embedded within an insulating core, which may be formed from thermoplastic elastomers (TPE), housed within an outer sheath formed from plastics material such as polyurethane (PUR). Thermosetting is used to bias the TPE core to return to a predefined shape.

Figure 1A:
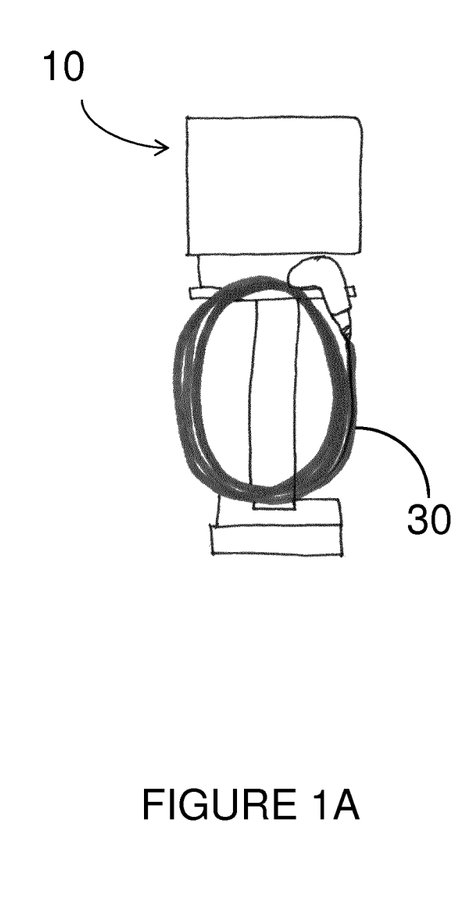
FIG. 1A shows a known electric vehicle charging station having a charging cable with no shape memory.
Figure 1B:
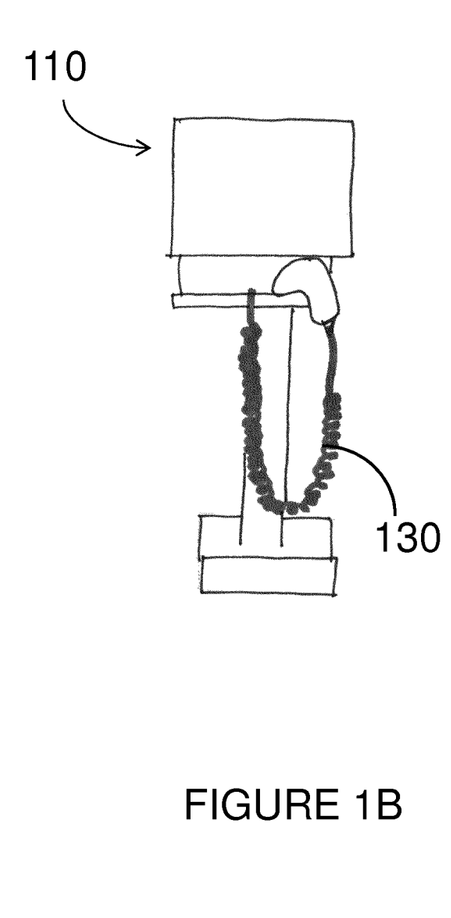
FIG. 1B shows a known electric vehicle charging station having a charging cable with shape memory wherein a substantial part of the charging cable is biased to adopt a coil or helical shape.
Figure 2:
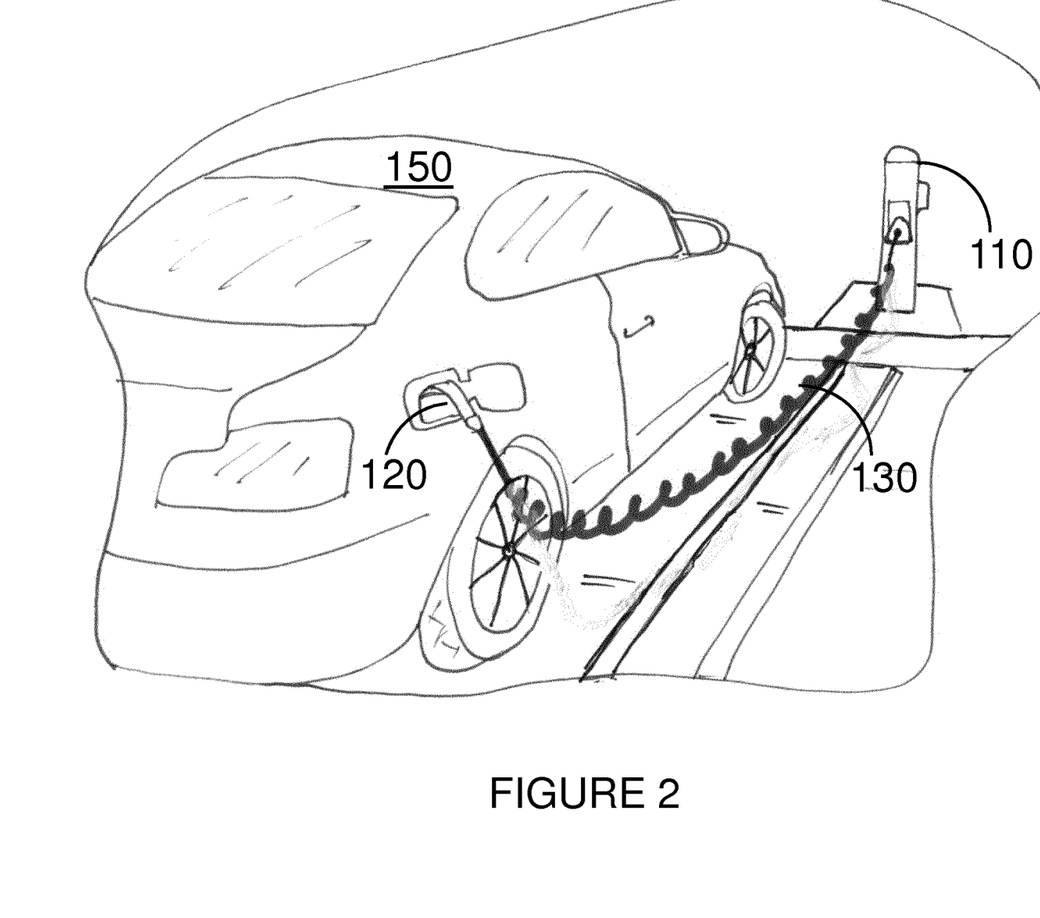
FIG. 2 shows an electric vehicle at the electric vehicle charging station of FIG. 1B wherein the charging cable is stretched and is suspended between the EV charging station and an access port of the vehicle and thus presents a trip hazard.

Such cables are useful, for example, for charging electric vehicles (EVs) and plug-in hybrid electric vehicles (PHEVs). Shape-memory charging cables may be provided at charging stations or transported in EVs and plug-in HEVs for use at public and private charging stations, which are often referred to as Electric Vehicle Supply Equipment (EVSE). In FIG. 1B a public EV charging station 110 is shown wherein a charging cable 130 is biased to return to a spiral form. The shape-memory in such coiled or spiral charging cables beneficially serves to reduce the time and labour involved in manually re-coiling standard charging cables for storage after use, such as the standard (no-shape-memory) cable 30 shown in FIG. 1A. Disadvantageously however, the shape-memory cables can present a trip hazard. For example, as illustrated in FIG. 2, in a situation where a user of an EV 150 extends a typical shape-memory coiled cable 130 between the EV 150 and a public charging station 110, the shape-memory of the cable 130 biases the cable 130 to return to its coiled shape and results in the cable 130 being suspended in a semi-tensioned state above the ground between the charging station 110 and a charging port of the EV 150. The cable suspended in this manner presents a potential trip hazard, which is particularly disadvantageous in public areas and where the charging EV 150 may be left unsupervised. In situations where the cable 130 is not entirely suspended above the ground, and a portion of the cable 130 rests on the ground, the coiled shape of the cable 130 creates loops which stick up above the ground which can also present a potential trip hazard.

The present invention seeks to provide an improvement in the field of shape-memory cables by providing a cable with a selective memory. Selective shape memory cables of the present disclosure can advantageously adopt a different shape and/or forget a passively inherent shape, for example a spiral. Such selective shape memory cables have particular application for charging EVs and plug-in HEVs and may solve the trip-hazard and/or other problems associated with prior art cables.

Some, but not necessarily all examples of the invention may be utilised in applications other than for vehicles and/or other than for charging. For example, it is foreseen that the invention may have application in power-supply cables, communications cables and other connecting cables and for a wide variety of apparatus, equipment and machinery, for example, but not exclusively, portable electric power generators, power tools (lawn mowers, hedge trimmers and the like), cleaning equipment (vacuum cleaners, steam cleaners and the like), audio equipment (amplifiers, PA systems and the like) and portable or temporary lighting and heating equipment.

SUMMARY OF THE INVENTION

Aspects of the invention provide a vehicle charging cable, also referred to herein as "cable", a power supply cable, a charging station, a vehicle, a method and a control unit.

According to one aspect of the invention for which protection is sought, there is provided a cable comprising: a body; one or more wires accommodated by the body; a first means for biasing a region of the body; and a second means for biasing all or part of said region of the body, said second means being responsive to an external stimulus.

Optionally, said second means is for biasing said region to counter act the biasing of said first means.

Optionally, the first means for biasing said region of the body of the cable is provided by a thermoplastic elastomer.

Optionally, the second means for biasing said region of the body of the cable is provided by a shape-memory alloy.

Optionally, the second means for biasing said region of the body of the cable is provided by one or more or a plurality of shape-memory alloy wires.

Alternatively, the second means for biasing said region of the body of the cable is provided by a shape-memory alloy mesh.

Optionally, the body comprises a core and an outer sheath and wherein the shape-memory alloy is provided within and/or forms part of the outer sheath.

Optionally, the body comprises a core and an outer sheath and wherein the shape-memory alloy is provided within and/or forms part of the core.

Optionally, said region of the body of the cable is biased by the first means to adopt a first coil-shape having a fixed radius of curvature.

Optionally, said region of the body of the cable is biased by the first means to adopt a spiral-shape having an increasing radius of curvature.

Optionally, said region of the body of the cable is biased to adopt a shape selected from the group comprising: a generally linear-shape, a substantially non-curved shape, a substantially non-helical shape and a substantially non-spiral shape, upon activation of said second means.

Optionally, said region of the body of the cable is biased to adopt a second coil-shape by said second means and wherein said second coil shape has a significantly larger radius of curvature than the first coil-shape adopted by said region under the sole influence of the first means.

Optionally, said region of the body of the cable is biased to adopt a second helical-shape by said second means, wherein said second helical shape has a significantly larger radius of curvature than the helical-shape adopted by said region of the body of the cable under the sole influence of the first means.

Optionally, the second means for biasing said region of the cable is positioned around an axis of the cable.

Optionally, the second means for biasing said region of the cable is positioned along or parallel to an axis of the cable.

Optionally, the second means for biasing said region of the cable is positioned only on one side or only within one circumferential sector of the cable.

Optionally, said external stimulus is an electrical, mechanical or thermal stimulus.

Optionally, the external stimulus is provided by a power source internal or external to the cable.

Optionally, said region comprises: the entire length of the cable; only a portion of the length of the cable; or two or more separate portions of the length of the cable. Where said region comprises two or more separate portions they may be each be stimulated independently in some embodiments and stimulated simultaneously in other embodiments. In some embodiments the two or more separate portions may run along different parts of the length of the cable to provide two distinct and separate regions. Additionally or alternatively, in some embodiments, the two or more separate portions may run along the same part of the length of the cable to provide supplementary (secondary) biasing to a selected region of the cable.

Optionally, the cable is an electrical power supply cable comprising a connector for use in connecting a vehicle to a charging station.

Optionally, upon connection of the cable for supplying electrical power said external stimulus is triggered and in response thereto, the second means biases said region of the cable and at least substantially or completely counteracts the biasing of the first region provided by said first means.

Optionally, the cable is an electrical power supply cable, the body comprises an inner core and an outer sheath formed from a thermoplastic elastomer which provides the first means for biasing said region of the body of the cable, said one or more wires accommodated by the body comprise: a live wire, an earth wire, a neutral wire, and a pilot signal wire disposed within the inner core of the body and the second means for biasing said region of the body of the cable is provided by a plurality of shape-memory alloy wires disposed only within one circumferential sector of the outer sheath such that in response to said external stimulus the second means biases said region of the cable and at least substantially or completely counteracts the biasing of the first region provided by said first means.

Optionally, the connector and/or cable comprises an indicator means for indicating to a user of the cable that the second means is active.

Optionally, the indicator means comprises a visual or audio signal. In some embodiments the visual indicator is provided by the change in the cables' shape. Additionally a visual indicator may be provided by a change in cable colour and/or a light or display panel indicator on the charging cable connector.

According to another aspect of the invention for which protection is sought, there is provided a charging station comprising a control unit and comprising a cable according to a relevant preceding paragraph.

According to yet an even further aspect of the invention for which protection is sought, there is provided a vehicle having a cable according to any relevant preceding paragraph.

According to yet another further aspect of the invention for which protection is sought, there is provided a method of controlling a cable according to any of the relevant preceding paragraphs, wherein the method comprises:
detecting connection of the cable to a vehicle or other appliance; and
detecting connection of the cable to an electrical power supply unit;
in response thereto causing the second means to bias all or part of said region of the body by the passing of an electrical current through said second means; and
causing the electrical power supply unit to supply electrical power using said one or more wires.

Optionally, the method further comprises:
conducting a security protocol to confirm said power supply unit is permitted to be used; and/or
conducting a rating protocol to confirm compatibility of appliance, electrical power supply unit and cable.

Conducting a security protocol and/or conducting a rating protocol may be performed by or in conjunction with a control system associated with the vehicle. Such a control system may communicate with the cable itself and/or with the charging station According to yet an even further aspect of the invention for which protection is sought there is provided a control unit for a charging station configured and arranged to carry out the method according to the immediately preceding relevant paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF EMBODIMENTS

Detailed descriptions of specific embodiments of the cables, power supply cables, electric vehicle charging stations, vehicles, methods and control units of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the cables, power supply cables, electric vehicle charging stations, vehicles, methods and control units described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 3:
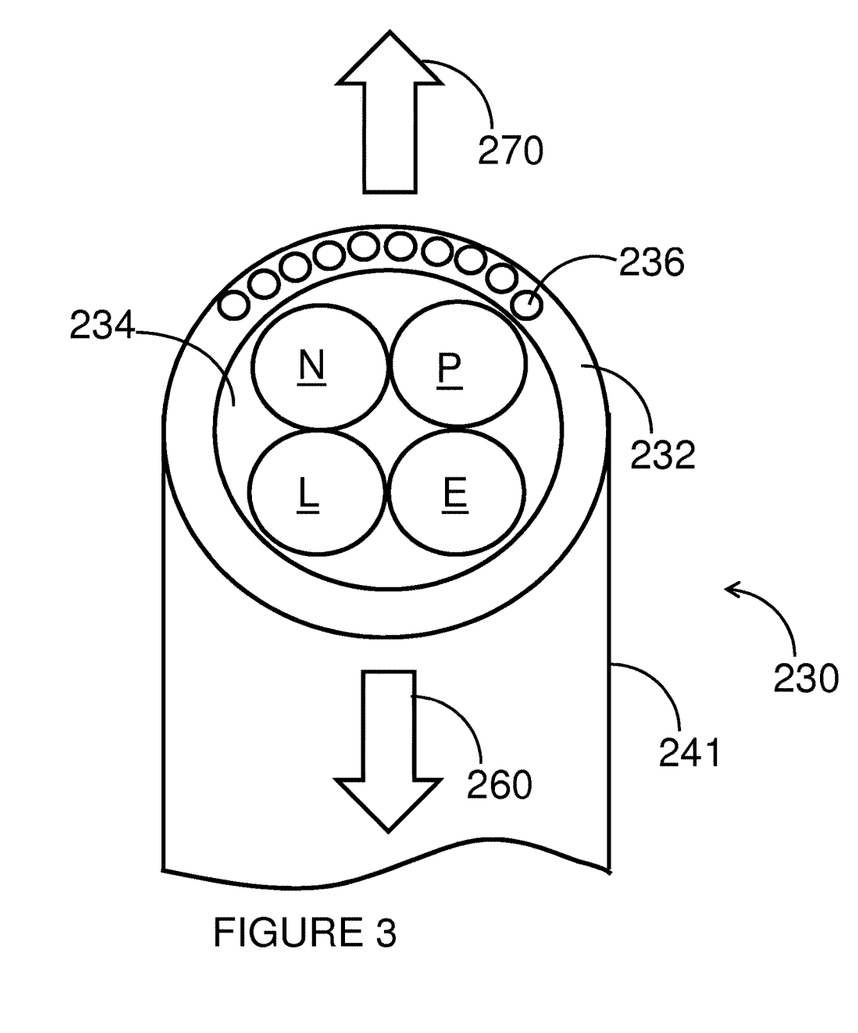
FIG. 3 shows a view cut-through a selective shape memory charging cable according to an embodiment of the invention.

In FIG. 3, there is shown a view of a cut end of part of a selective memory cable 230 according to an embodiment of the disclosure. The selective memory cable 230 (also referred to herein simply as "cable" and "charging cable") comprises a body 241 and one or more wires 'N', 'P', 'L', 'E' accommodated by the body 241.

The cable 230 comprises an inner core 234 and an outer sheath 232 which together form the body 241 of the selective memory cable 230. The outer sheath 232 provides a protective jacket to mitigate against the ingress of dust, oil and water internally of the cable 230 and is optional. The inner core 234 may provide electrical insulation as well as rigidity to the selective memory cable 230. The body 241 of the selective memory cable 230 provides a protective housing for the one or more wires 'N', 'P', 'L', 'E'.

Figure 6:
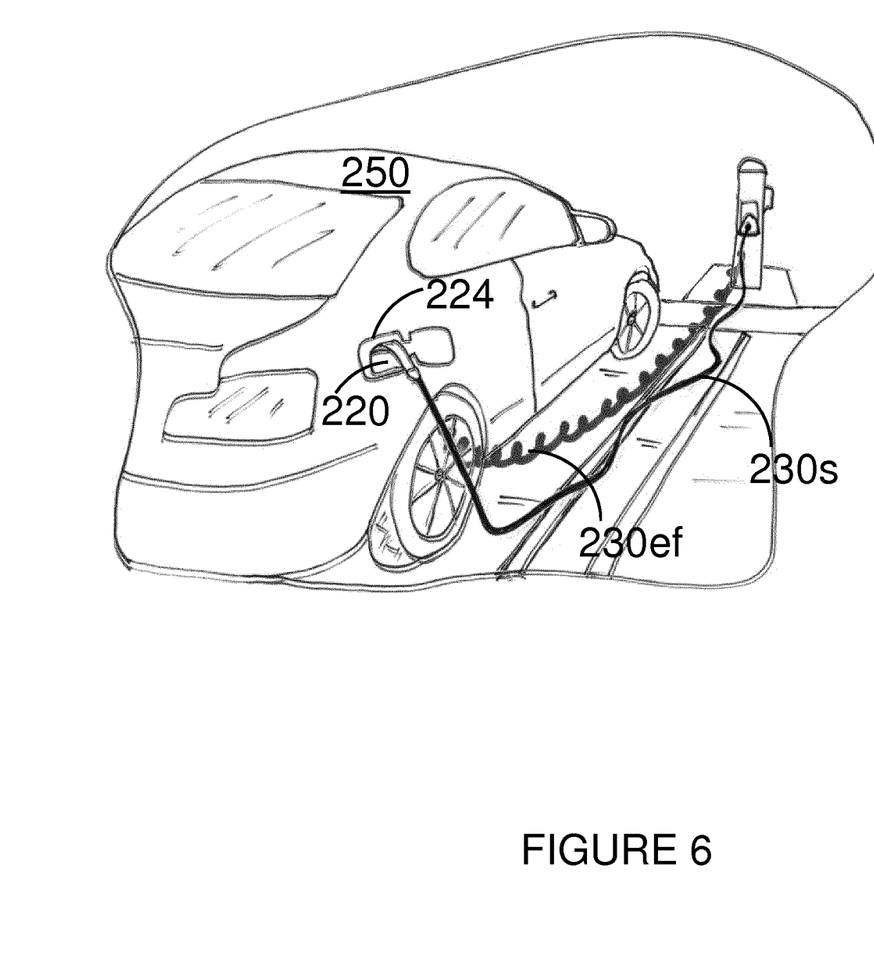
FIG. 6 shows the selective memory charging cable of FIGS. 3 to 5 in a first state and in a second state illustrating the difference in shape and position of the cable in the two states.
Figure 7:
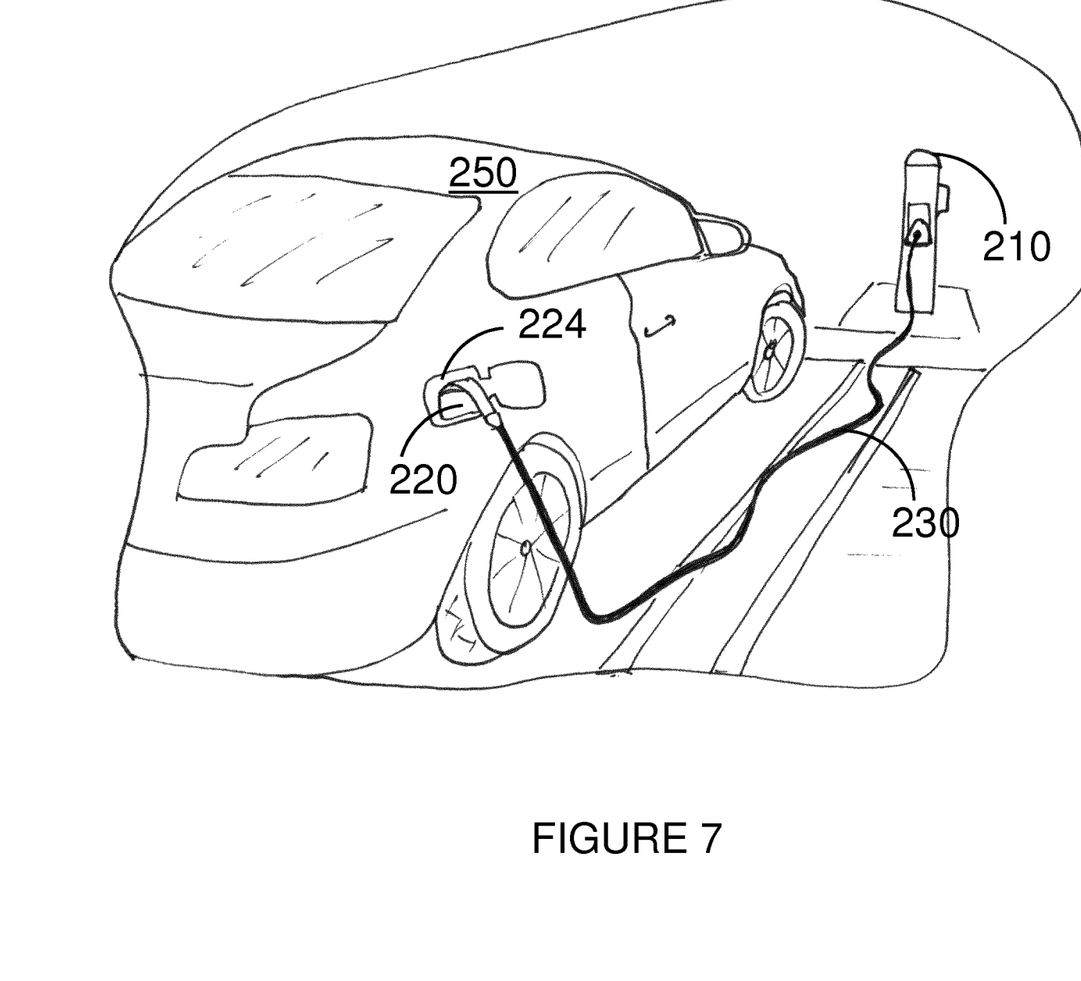
FIG. 7 shows the selective memory charging cable of FIG. 6 only in the second state wherein the second means biases the selective memory charging cable to adopt the second, neutral, position.

In the illustrated arrangement, the selective memory cable 230 is optionally configured for use as a charging cable, for example, for a vehicle, such as an electric vehicle (EV) 250 (see FIGS. 6 and 7). Therefore, in this arrangement, the one or more wires comprise four wires: a neutral (N); a live (L); an earth (E); and a pilot (P). The one or more wires 'N', 'P', 'E' each extend along the entire length of the selective memory cable 230, substantially parallel to one another and disposed within the inner core 234. The one or more wires 'N', 'P', 'L', 'E', are optionally moulded in an embedded manner within the inner core 234. In other arrangements, the one or more wires are over moulded within the inner core. As shown in FIGS. 6 and 7, one end of the selective memory cable 230 is optionally connectable to a charging station 210 and the other end of the selective memory cable 230 is optionally connectable to a connector 220 that is compatible with a charging inlet 224 (also referred to herein as charging port 224) provided on the vehicle 250.

Figure 5:
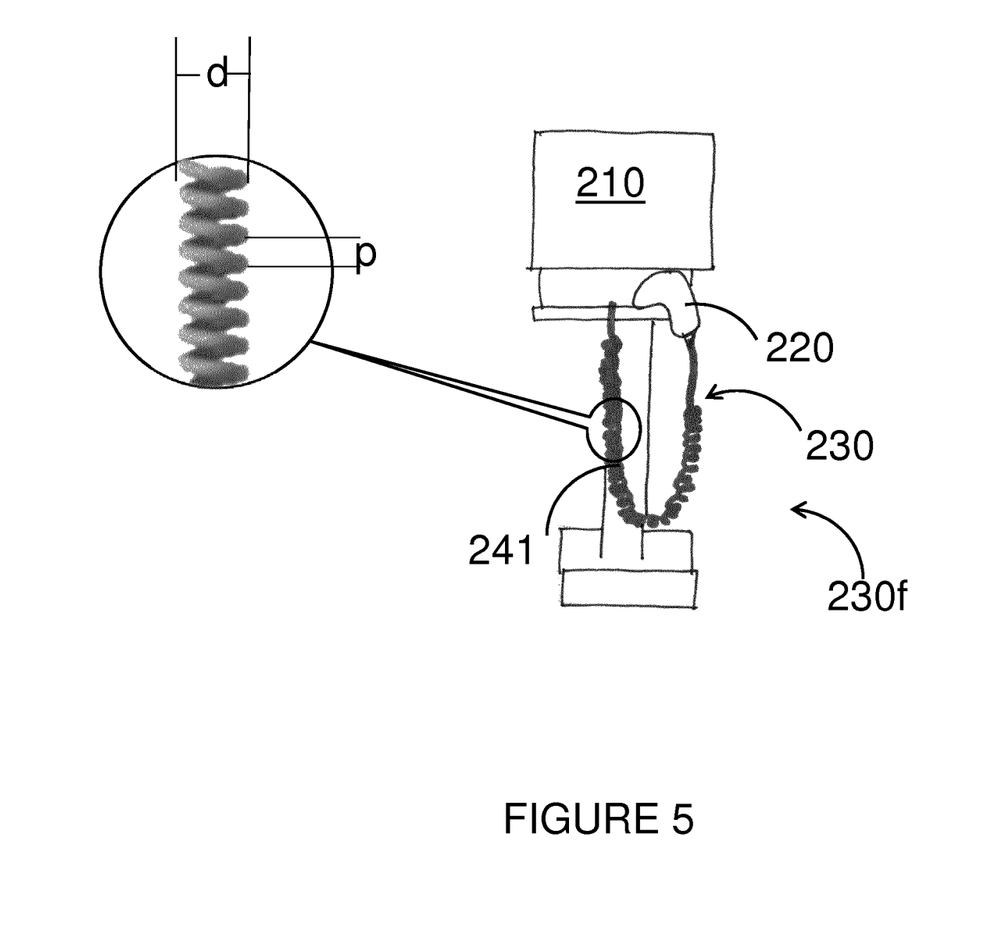
FIG. 5 shows an electric vehicle charging station having a selective memory charging cable according to an embodiment of the invention wherein the cable is coiled and in a stowed state.

The cable 230 also comprises a first means 234, optionally provided by the inner core 234, for causing all or part of the body 241 of the cable 230 to adopt a first cable state 230f. In the first cable state, the cable 230 is passively biased to adopt a first position, which, as shown in FIG. 5, is coiled or helical.

The first cable state (indicated by 230f) is a passive state in which the cable 230 is not actively operated and wherein the inherent shape memory of the cable 230 biases the cable 230 to return to a tightly coiled, spiralled or wound arrangement to facilitate storage of the cable 230.

In the first state, a region of the cable 230 is biased to adopt a coil shape optionally having a pitch 'p' and a diameter 'd'. The end to end length of the cable 230 in the first state can be extended, (by increasing the pitch 'p'), by forcing the opposing ends of the cable 230 away from one another. This is shown in FIG. 6 (indicated by 230ef) and may be considered as an extended position of the cable 230 in the first shape memory state.

The cable 230 also comprises a second biasing means 236 for causing all or part of the body 241 of the cable 230 to adopt a second cable state (indicated by 230s) in FIG. 6. In the second cable state the cable 230 (or part of the cable 230) is biased to adopt a second position or shape that is different from said first position or shape and is considered an "active" state 230s wherein the arrangement of the cable 230 may be described as unwound, uncoiled, relaxed and/or neutral. The cable 230 in the active state 230s is shown in FIG. 7. In FIG. 6, the cable 230 in the first (extended) state 230ef is superimposed upon an illustration of the cable 230 in the second state 230s to clearly illustrate the change in shape and position of the cable 230 in the first and second states.

The second biasing means 236 is configured and arranged to counteract the inherent shape memory provided by the first biasing means 234 and in effect can be used to actively, selectively and controllably cause the inherent shape memory to be forgotten for a controlled period of time. The second biasing means 236 is responsive to an external stimulus, such that switching the cable 230 between the first stowed state and the second active state can be controlled either manually or automatically. In this way, the cable 230 can be connected between an EV 250 and a charging station 210 in the first state (as shown in FIG. 6) and then switched to the active state so that the inherent shape memory is temporarily "forgotten" to allow the cable 230 to drape along the ground in a natural manner as shown in FIGS. 6 and 7. During charging, the trip hazard that would otherwise have been associated with the coiled cable 230 in the first passive state 230ef, is therefore minimised or removed by switching the cable 230 to the second active state 230s. Once charging is completed, the cable 230 can be switched back to the first state 230ef, which switches off the second biasing means 236 and enables the first biasing means 234 to control the shape adopted by the cable 230 such that upon returning the connector 220 to charging station the cable 230 re-coils into the first state 230f for easy storage. In some embodiments, switching the cable 230 to the active state may be conducted prior to plugging the cable into an appliance such as an EV 250.

In some, but not necessarily all embodiments, a power source internal or external to the vehicle charging cable causes the second means to bias all or part of said region of the body such that the cable 230 remains in the second state 230s until disconnection of the cable 230 from one or both the electrical power supply unit 210 or the EV 250, or for a period of time after disconnection of the cable 230 from one or both of the power supply unit 210 or the EV 250. An advantage is that the cable does not unexpectedly recoil into the first state 230ef.

The selective memory cable 230 may be formed in various lengths in dependence upon the application of the cable 230. As illustrated in FIG. 5, the first and second biasing means 234, 236 are each provided continuously along a single section (portion) of the cable 230 body 241 spanning about 95% or more of the length of the charging cable 230 body 241. In other arrangements, the first and second biasing means 234, 236 may be provided in more than one separate and spaced sections (portions) of the cable 230. As such in the following description where the shape and properties of the cable are discussed in relation to the illustrated embodiment having a single active section (portion), it will be understood that in other arrangements, a selective memory cable comprises more than one active section (portion) each of which may have similar shapes and properties to those described in respect of the present embodiment.

Returning to FIG. 3, the first and second biasing means 234, 236 of the illustrated embodiment are now described in further detail. The outer sheath 232 and/or the inner core 234 comprise an inherent shape memory. In this arrangement, the inner core is formed from a thermoplastic elastomer (TPE) material which has been thermoformed into a spiral shape. The protective outer sheath 232 may be formed from a different plastics material, such as polyurethane and follows the shaped form of the inner core 234. As shown in FIG. 3, the thermosetting bias causes the selective memory cable 230 to curve into a spiral shape. The biasing direction provided by the thermoformed TPE inner core 234 is indicated by arrow 260. The shape memory that biases the selective memory cable 230 to curve into a spiral, coil or other helical type shape may be described as permanent and non-selective, in other words, absent a force being applied to the selective memory cable 230, the selective memory cable 230 is biased to adopt a spiral shape (as illustrated in FIG. 5) by the inner core 234 and this property is not removed as such.

The selective memory cable 230 additionally comprises, in at least one region thereof, the second biasing means 236 which, when switched on, selectively counter-acts the effect of the passive thermoset shape memory provided by the first biasing means 234. In response to a trigger (external stimulus), the selective memory cable 230 can adopt a second shape or second position that is different to the first shape or first position that the cable 230 is inherently biased to adopt. Optionally, and as illustrated in FIG. 3, a series of wires 236 are provided in the outer sheath 232. The series of wires 236 are optionally positioned such that they extend along the length of a region of the cable 230 and are optionally arranged around part of the circumference of the outer sheath 232 such that the wires follow a path along an outer side of the cable 230 when coiled. Optionally, the wires 236 extend the full length of the cable 230 between each end of the cable 230. The wires 236 are formed from or comprise a shape memory alloy (SMA) that is activated by an electrical current flowing though the wires 236. The presence of a sufficient electrical current causes the wires 236 to heat. When the wires 236 reach a transition temperature they are activated and attempt to adopt a pre-formed shaped. The pre-formed shape is in opposition to the coiled shape of the body 241 of the cable 230, such that in the region of the wires 236, the cable 230 is forced or biased in the direction indicated by arrow 270 in FIG. 3. As can be seen the position, number and configuration of the shape memory alloy wires 236 is such that upon activation, the wires 236 attempt to adopt their pre-formed position which creates a force that is directly opposed to the shape biasing force 260 provided by the inner core 234. The passive biasing force (260) provided by the inner core 234 is thereby balanced or countered such that the selective memory cable 230, in the region of the shape memory alloy wires 236 is not forced or biased to adopt a particular shape as such and may therefore adopt a substantially neutral shape or a substantially neutral, draped, position.

Figure 4A:
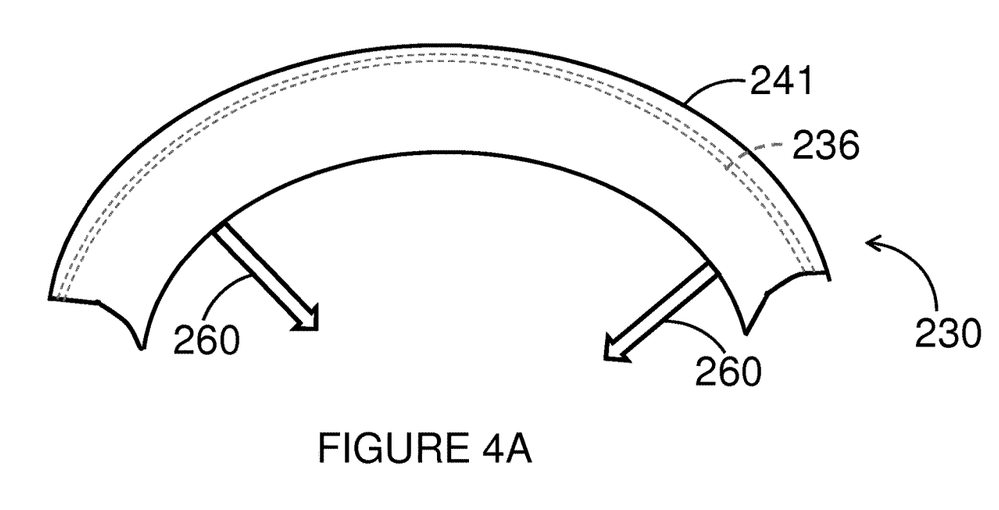
FIG. 4A shows a side view of a region of the selective shape memory charging cable shown in FIG. 3 wherein a first means biases a region of the body of the cable to adopt a first, coiled or curved, position.
Figure 4B:
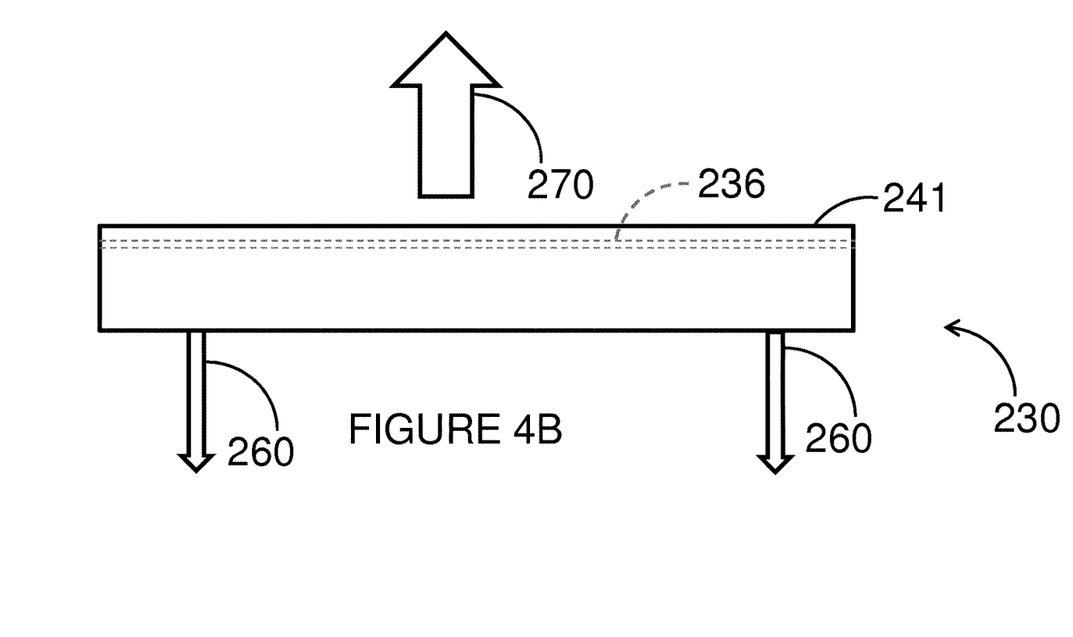
FIG. 4B shows a side view of the region of the selective shape memory charging cable shown in FIG. 4A wherein a second means biases that region of the body of the cable to adopt a second, neutral, position.

This is illustrated in FIGS. 4A and 4B, wherein a portion of selective memory cable 230 is shown in first and second positions respectively. As can be seen in FIG. 4A the inherent biasing force (indicated generally by arrows 260), provided by the plastics material from which at least part of the cable 230 is formed, causes the cable 230 to adopt a curved shape or be positioned in a curved manner having a radius of curvature. Once the wires 236 are activated and attempt to adopt their pre-formed shape the cable 230 is pulled in the opposite direction (see FIG. 4B). Optionally in the present application, the wires 236 are arranged and configured such that upon heating the shape memory of the plastics inner core 234 is substantially cancelled out and countered by the wires 236, such that the cable 230 adopts a linear and unforced second position.

Optionally, the number, position, configuration, pre-formed shape and transition (activation) temperature of the one or more wires 236 are selected in order to control how a selective memory cable 230 can be re-shaped. In the application of a charging cable for an EV 250, it is beneficial for the means for selectively counter-acting the effect of the shape memory provided by the first biasing means 234 to control the cable 230 to adopt a slack and non-coiled state during charging. In this way a coiled cable 230 of a charging station 210 (see FIG. 5), once electrically connected to a vehicle 250 (see FIG. 7) "forgets" the coiled shape and adopts a slack, neutral state, wherein the cable 230 is not suspended above ground level, but rather can rest on the ground between the vehicle charging port 224 and charging station 210 (as discussed above and as shown in FIGS. 6 and 7).

Once charging is concluded and the cable 230 is disconnected from the EV 250, the wires 236 cool and are no longer biased to adopt their pre-formed position, such that the cable 230 can again be biased solely by the shape memory of the plastics inner core 234 and automatically adopt a coiled state.

The selective memory cable 230 is optionally manually operated or automatically operated. In some embodiments, a connector 220 may comprise a human machine interface (HMI) for switching between the two states of the cable 230. The HMI may, for example take the form of a depressible button, trigger or other manually switchable device, or may take the form of a screen or control panel selectable option. In this way a user of the cable 230, optionally upon connecting the cable 230 to the vehicle 250 can trigger activation of the selective shape memory to cause the cable 230 to adopt the second, neutral or slack position. Then, once the user is ready to or has disconnected the cable 230 from the EV 250, the user can again operate the HMI to trigger deactivation of the selective shape memory to cause the cable 230 to adopt the first state wherein the cable 230 is coiled, spiralled or formed into another helical shape.

A further optional aspect of the disclosure provides a method of controlling a selective memory cable 230. The method is performed by a control module associated with the cable 230. The method is performed by a control module within the vehicle 250. In envisaged embodiments the control module may be provided within the connector 220, within a control module of the cable and/or within or associated with a charging station 210. The method comprises detecting that the cable 230 has been connected to a vehicle 250 and detecting connection of the cable 230 to an electrical power supply unit 210. In the present embodiment where the cable 230 is activated by heat from electrical current flow, proper electrical connection with the vehicle 250 may be required before the selective memory cable 230 can be operated. Once it is determined that the cable 230 is connected at both ends (to the charging unit 210 and vehicle respectively), it can be inferred that activation of the selective memory cable 230 is required and in response thereto the control module can automatically trigger activation of the second biasing means.

The control method may also comprise conducting a security protocol to confirm that the charging station (power supply unit) is permitted to be used by the intended user. This security protocol may check that payment will be made. The control method may also include conducting a rating protocol to confirm compatibility of the vehicle, the electrical power supply unit and the cable. Such checks may be conducted by the power supply unit communicating with the cable and/or may be conducted by a control system of the vehicle communicating with the cable and/or the power supply unit. A protocol conducted by either the vehicle's control system or the power supply unit carried out prior to permitting charging may incorporate additional or alternative checks.

In the control method, temperature of the cable 230 is measured by one or more sensors, such as thermocouples (not shown) positioned at spaced locations along the length of the cable 230. The temperature of the cable 230 will change in dependence upon ambient conditions, how long the cable 230 has been in an active state for and other factors and these are monitored and considered in order to ensure that the cable 230 is maintained within an acceptable temperature range during active operation of the cable 230.

Current flow through the wires 236 is controlled in dependence upon temperature and does not necessarily follow a constant current flow profile. For example, the current flow may be ramped up gradually and once it is detected that an activation temperature of the wires 236 has been reached or exceeded, the current may be pulsed to maintain the temperature of the wires 236 sufficiently above the activation temperature so that the thermoset bias of the first biasing means is sufficiently overcome whilst at the same time, mitigating against excessive heating of the cable 230.

An increase in temperature of the cable 230 associated with activation of the second biasing means and/or charging can be utilised to provide a deliberate secondary heating function of the cable 230. For example, in cold conditions, for the operator's comfort and/or for de-icing purposes, the cable 230 being in an active state and/or a charging state generates heat which is used to increase the temperature of the cable 230 to a safe and desired temperature. Such a heating function may be triggered in some arrangements by a vehicle identified climate temperature, e.g. an ambient temperature.

The current flow path through the one or more wires 236 of the second biasing means may not follow the same linear path as current flow through a live wire 'L' of the one or more wires and is electrically isolated from the one or more primary wires 'P', 'N', 'L', 'E' housed by the cable 230. In the present arrangement, current flows in one direction in the electrical circuit of the second biasing means 236: from a live terminal at the charging station end to a neutral terminal at the EV connector 220 end. In other embodiments, current flows in the opposite direction. In yet further envisaged embodiments, current flows in both directions. In some arrangements the live and neutral terminals for the electrical circuit of the second biasing means wires 236 are both at either the EV connector 220 end or are both at the charging station end.

It is envisaged that the second biasing means 236 may be arranged into more than one separate electrical circuits in each of which current can independently flow. In such arrangements, the control method may include a timing order for passing current through each of the separate wiring circuits 236. This may be determined for example by the amount of extended cable 230.

It can be appreciated that various changes may be made within the scope of the present invention, for example, the selective memory cable 230 may comprise one of a variety of suitable connectors at each end thereof to make the selective memory cable 230 compatible with one or more appliances and/or one or more power sources. In the illustrated application, the selective memory cable 230 is a charging cable for use with the EV 250 shown in FIGS. 6 and 7. As such, one end is connected to a plug connector 220 for mating with a charging inlet (port) of the vehicle 250 and the other end is connected to the charging station 210. However, where the selective memory cable according to the disclosure is used for another purpose, for example as a power cable for an appliance such as a vacuum cleaner, one end of the cable 230 may be directly connected to the appliance and the other end may comprise a standard mains supply compatible plug, for example a three-pin plug.

Figure 8A:
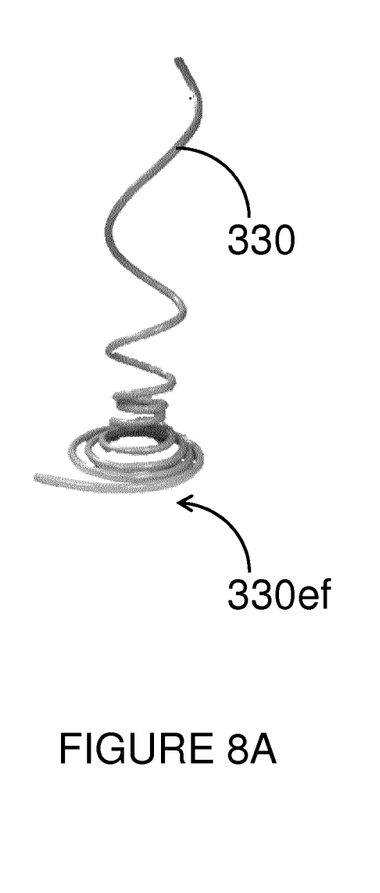
FIGS. 8A and 8B show a selective memory cable according to another embodiment of the disclosure.
Figure 8B:
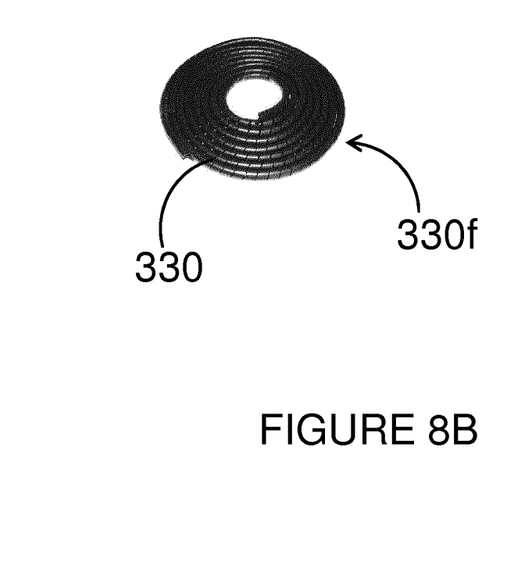

In other embodiments of the invention it is envisaged that the cable 230 may have other first pre-formed shapes or may adopt different first positions in the "first state". In FIGS. 8A and 8B there is shown a selective memory cable 330 wherein a first thermoset bias causes the cable to adopt a spiral-shape cable 330 having an increasing (or decreasing) radius of curvature. In FIG. 8A the cable 330 is shown in an extended first state wherein the second biasing means is off and wherein the cable 330 is stretched. In FIG. 8B, the cable 330 is shown in a first state 330*f* where the cable 330 is coiled ready for storage. Such cables 330 may be useful as portable cables 330 that are transported in the EV for use at private and public charging stations. As described above a second biasing means (not shown) is provided to cancel out the passive thermosetting bias that causes the cable 330 to form a flat coil for storage.

As used herein, the term "cable" refers to all manner of electrical cords that can connect or link two spaced apart components. A cable is typically an elongate structure comprising one or more wires, fibres, narrower cables or cords each of which may transfer any of: electrical power; digital, analogue, optical and/or electrical data and/or telecommunications signals; and/or which may provide a neutral earth or ground connection. Any reference to cable should not be construed as necessarily referring to a charging cable only; indeed it is envisaged that a cable may provide any one or a combination of the following functions: electrical power supply, data and/or communications, optical communications, computer network connections.

It should be understood that cable, cords, lines, leads and links can each include electrically conductive and/or communication elements that may comprise one or more: wires, twisted pairs, coaxial cables, optical fibres housed within or providing a core of the cable. The elements can be dimensioned and arranged to provide the desired functionality. For example, a cable comprising a live wire, neutral wire, earth wire and pilot signal wire can be dimensioned or designed with varying degrees of selective memory along its length to provide a power supply cable that has selective memory in one or more regions or along the entire length of the cable.

Cables and the elements they contain are not necessarily limited to being circular in cross-section and the inventions of the disclosure may be utilised in cables having other cross-sectional shapes, such as oval, square, rectangular, triangular or other regular or irregular polyhedral cross-sections, for example.

The following numbered paragraphs contain statements of invention:

1. A cable comprising:
   (i) a body;
   (ii) one or more wires accommodated by the body;
   (iii) a first biaser for biasing a region of the body; and
   (iv) a second biaser biasing all or part of said region of the body, said second biaser being responsive to an external stimulus.
2. A cable according to paragraph 1 wherein said second biaser is for biasing said region to counteract the biasing of said first biaser.
3. A cable according to paragraph 1 wherein the first biaser is provided by a thermoplastic elastomer.
4. A cable according to paragraph 2 wherein the second biaser is provided by a shape-memory alloy and wherein the second biaser is provided by: one or more or a plurality of shape-memory alloy wires and/or by a shape-memory alloy mesh.
5. A cable according to any paragraph 4 wherein the body comprises a core and an outer sheath and wherein the shape-memory alloy is provided within and/or forms part of the outer sheath and/or forms part of the core.
6. A cable according to paragraph 1 wherein, a region of the body of the cable is biased by the first biaser to adopt a first coil-shape having a fixed radius of curvature.
7. A cable according to paragraph 1, wherein, said region of the body of the cable is biased by the first biaser to adopt a spiral-shape having an increasing radius of curvature.
8. A cable according to paragraph 7 wherein, said region of the body of the cable is biased to adopt a shape selected from the group comprising: a generally linear-shape, a substantially non-curved shape, a substantially non-helical shape and a substantially non-spiral shape upon activation of said second biaser.
9. A cable according to paragraph 7 wherein said region of the body of the cable is biased to adopt a second coil-shape by said second biaser and wherein said second coil shape has a significantly larger radius of curvature than the first coil-shape adopted by said region under the sole influence of the first biaser.
10. A cable according to paragraph 7 wherein said region of the body of the cable is biased to adopt a second helical-shape by said second biaser, wherein said second helical shape has a significantly larger radius of curvature than the helical-shape adopted by said region of the body of the cable under the sole influence of the first biaser.
11. A cable according to paragraph 1 wherein the second biaser is positioned radially about an axis of the cable.
12. A cable according to paragraph 1 wherein the second biaser is positioned along or parallel to an axis of the cable.
13. A cable according to paragraph 13 wherein the second biaser is positioned only on one side or only within one circumferential sector of the cable.
14. A cable according paragraph 1 wherein said external stimulus is an electrical, mechanical or thermal stimulus and wherein the external stimulus is provided by a power source internal or external to the cable.
15. A cable according to paragraph 1 wherein said region comprises: the entire length of the cable; only a portion of the length of the cable; or two or more separate portions of the length of the cable.
16. A cable according to paragraph 1 wherein the cable is an electrical power supply cable comprising a connector for use in connecting a vehicle to a charging station and wherein upon connection of the cable for supplying electrical power said external stimulus is triggered and in response thereto, the second biaser biases said region of the cable and at least substantially or completely counteracts the biasing of said region provided by said first biaser.
17. A cable according to paragraph 1 wherein the cable is an electrical power supply cable, wherein the body comprises an inner core and an outer sheath formed from a thermoplastic elastomer which provides the first biaser, wherein said one or more wires accommodated by the body comprise: a live wire, an earth wire, a neutral wire, and a pilot signal wire disposed within the inner core of the body and wherein the second biaser is provided by a plurality of shape-memory alloy wires disposed only within one circumferential sector of the outer sheath such that in response to said external stimulus the second biaser biases said region of the cable and at least substantially or completely counteracts the biasing of the first region provided by said first biaser.
18. A cable according to paragraph 17 wherein the connector and/or cable comprises an indicator for indicating to a user of the cable that the second biaser is active and wherein the indicator comprises a visual or audio signal.
19. A charging station comprising a control unit and comprising a cable according to paragraph 18 or having a cable according paragraph 18 associated therewith.
20. A vehicle having a cable according to paragraph 1.

The invention claimed is:

1. A vehicle charging cable arranged to adopt a slack state during charging of a vehicle by an external power supply, the vehicle charging cable comprising:
   (i) a cable body;
   (ii) one or more wires accommodated by the cable body, the one or more wires extending along and within the cable body;
   (iii) a first biaser for biasing a region of the cable body, the first biaser extending along the cable body and providing the vehicle charging cable with an inherent shape memory; and
   (iv) a second biaser, extending along the cable body, for biasing all or part of said region of the cable body, said second biaser being responsive to an external stimulus, wherein said second biaser is for biasing said region during application of said external stimulus to counteract the inherent shape memory provided by said first biaser such that the vehicle charging cable adopts a slack state, wherein upon connection of the vehicle charging cable for supplying electrical power from the external power supply to the vehicle, said external stimulus is triggered and in response thereto, the second biaser biases said region of the vehicle charging cable and at least partially counteracts the biasing of said region provided by said first biaser.

2. A method comprising:

detecting connection of a vehicle charging cable to one of a vehicle or an electrical power supply, the vehicle charging cable arranged to adopt a slack state during charging of the vehicle by the electrical power supply, the vehicle charging cable comprising:
- (i) a cable body;
- (ii) one or more wires accommodated by the cable body, the one or more wires extending along and within the cable body;
- (iii) a first biaser for biasing a region of the cable body, the first biaser extending along the cable body and providing the vehicle charging cable with an inherent shape memory; and
- (iv) a second biaser, extending along the cable body, for biasing all or part of said region of the cable body, said second biaser being responsive to an external stimulus, wherein said second biaser is for biasing said region during application of said external stimulus to counteract the inherent shape memory provided by said first biaser such that the vehicle charging cable adopts a slack state; and
    - in response to detecting the connection, causing the second biaser to bias all or part of said region of the cable body by the external stimulus comprising passing an electrical current through said second biaser;

and
  causing the second biaser to continue to bias all or part of said region of the cable body until disconnection of the vehicle charging cable from the electrical power supply or from the vehicle.

3. A method according to claim 2, comprising:

conducting a security protocol to confirm said power supply is permitted to be used; and conducting a rating protocol to confirm compatibility of the vehicle, the electrical power supply and the vehicle charging cable.

4. A method according to claim 2, comprising:

causing the second biaser to continue to bias all or part of said region of the cable body for a period of time after the disconnection of the vehicle charging cable from the electrical power supply or from the vehicle.

5. A method according to claim 2, wherein the electrical current through said second biaser is controlled in dependence on an ambient temperature, a vehicle identified climate temperature or a detected temperature of at least one element of the vehicle charging cable.

6. A control unit for a charging station configured and arranged to carry out the method according to claim 2.

* * * * *